Figure 1:
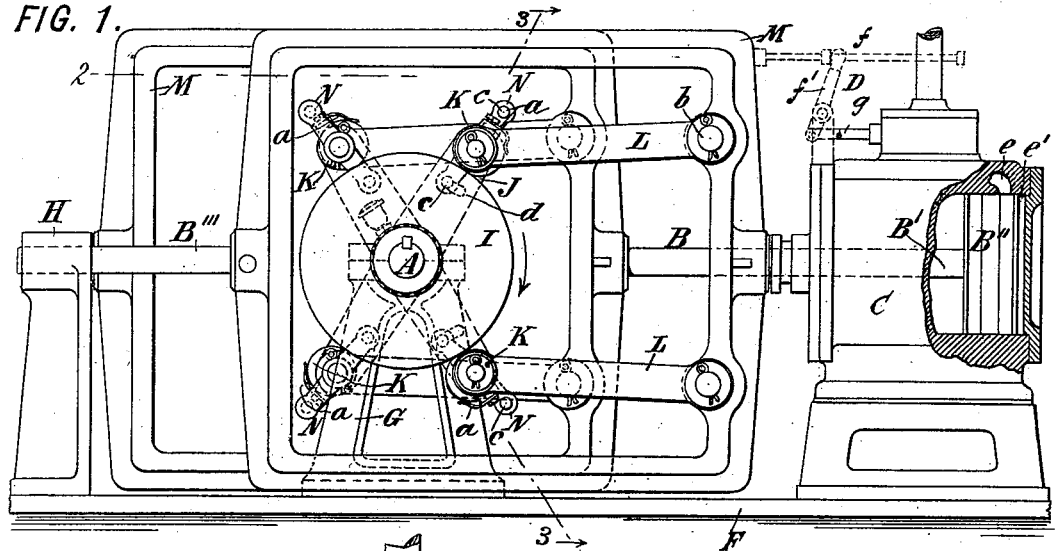

(No Model.) 2 Sheets—Sheet 1.

J. J. O'NEILL.
INTERMITTENT GRIP DEVICE FOR TRANSMITTING MOTION.

No. 532,900. Patented Jan. 22, 1895.

WITNESSES:
John Becker
Fred White

INVENTOR:
John J. O'Neill,
By his Attorneys,
Arthur C. Fraser

THE NORRIS PETERS CO., PHOTO-LITHO., WASHINGTON, D. C.

(No Model.) 2 Sheets—Sheet 2.
J. J. O'NEILL.
INTERMITTENT GRIP DEVICE FOR TRANSMITTING MOTION.
No. 532,900. Patented Jan. 22, 1895.
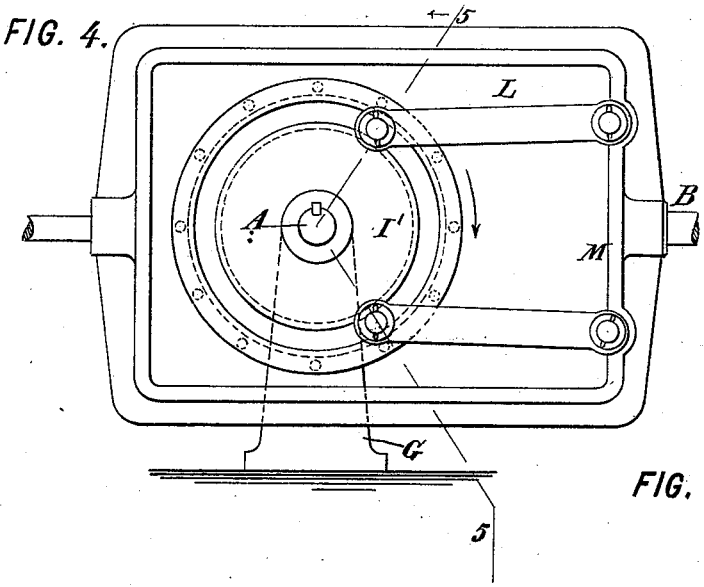
FIG. 4.
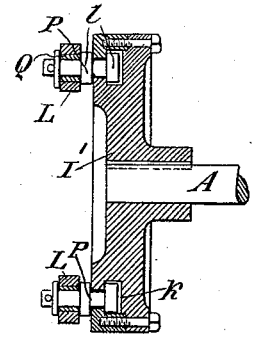
FIG. 5.
FIG. 6.
FIG. 7.
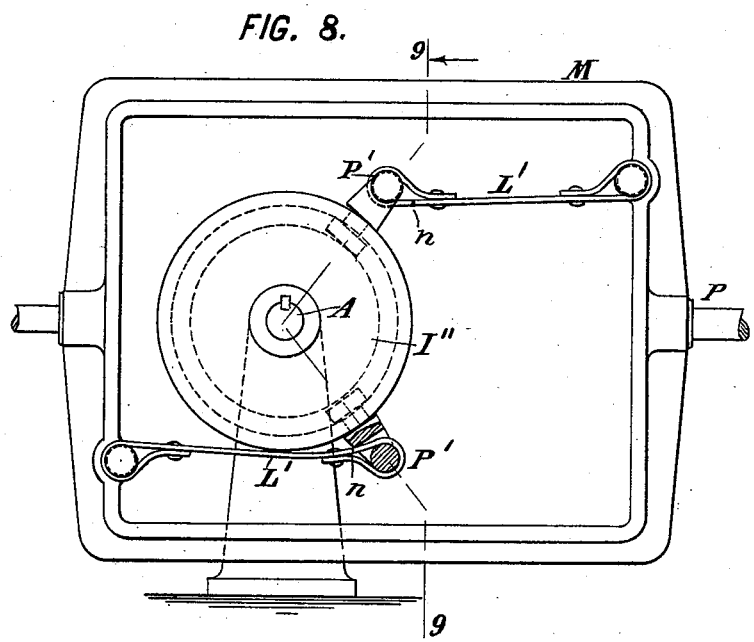
FIG. 8.
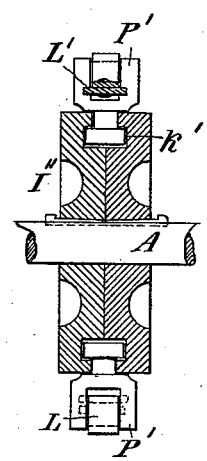
FIG. 9.
WITNESSES:
John Becker
Fred White
INVENTOR:
John J. O'Neill,
By his Attorneys,
Arthur E. Fraser & Co.

UNITED STATES PATENT OFFICE.

JOHN J. O'NEILL, OF NEW YORK, N. Y.

INTERMITTENT GRIP DEVICE FOR TRANSMITTING MOTION.

SPECIFICATION forming part of Letters Patent No. 532,900, dated January 22, 1895.

Application filed May 17, 1892. Serial No. 433,263. (No model.)

*To all whom it may concern:*

Be it known that I, JOHN J. O'NEILL, a citizen of the United States, residing in the city, county, and State of New York, have invented certain new and useful Improvements in Intermittent Grip Devices for Transmitting Motion, of which the following is a specification.

This invention relates to engines or motors having a rotative shaft and a reciprocating rod, the one adapted to drive the other.

The invention aims to provide an improved engine of this character in which there will be no dead centers, in which the driving connection between the parts will be such as to give the best advantage of leverage, and to provide certain other improvements as will be hereinafter set forth.

In carrying out the preferred form of my invention, I provide a disk on the shaft having a peripheral face, a link mounted loosely upon the shaft extending beyond this face, an eccentrically mounted friction wheel carried by this link and adapted to engage the peripheral face of the disk, and a connecting rod between the piston-rod and the link adapted to cause the latter to follow the movements of the piston-rod, whereby when the piston-rod moves in one direction the friction pulley, by reason of its eccentricity, engages the periphery of the disk, and thereby causes it and the shaft to revolve as the piston-rod moves in that direction, and upon the reverse motion of the piston-rod, the friction-wheel disengages from the disk and thereby frees the shaft relatively to the rod as the rod moves in the opposite direction. Preferably the piston-rod is constructed as a yoke surrounding the shaft and disk, and the clutches are duplicated, one adapted to engage in one direction of movement of the rod, and the other in the other direction of movement. Certain improved details of construction are also provided which will be hereinafter fully set forth.

Figure 2:
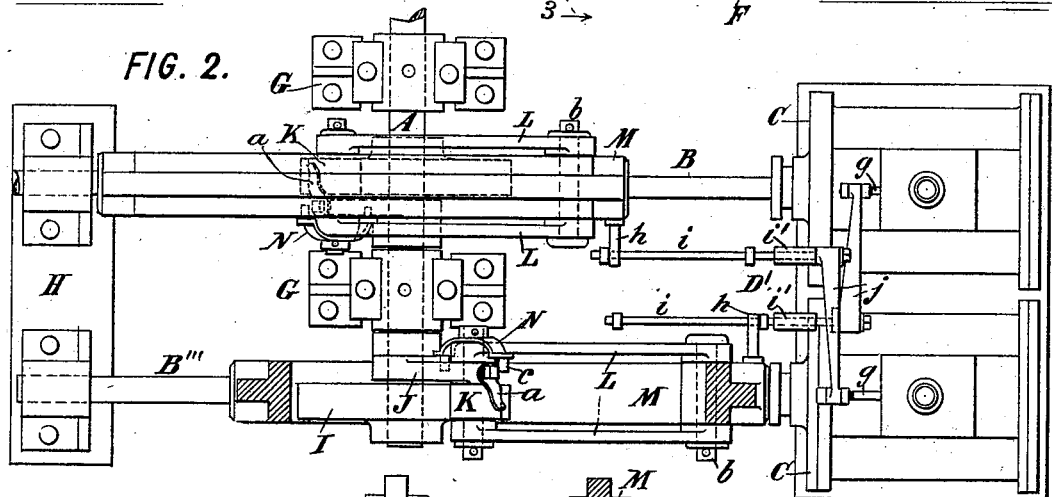
Figure 3:
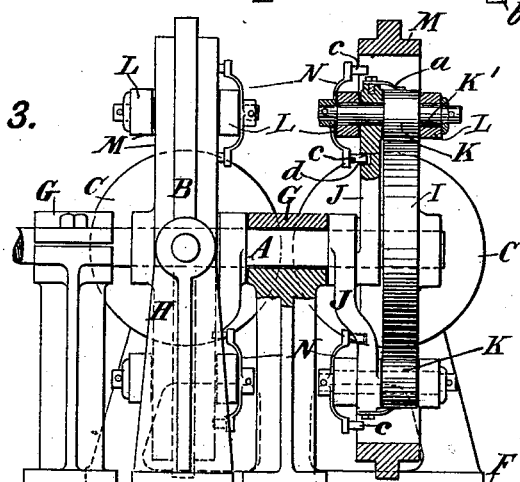

In the accompanying drawings, which illustrate my invention, Figure 1 is a side elevation of a duplex steam engine constructed according to the preferred form of my invention. Fig. 2 is a plan view thereof, the yoke of the lower piston-rod being in section. Fig. 3 is an end elevation thereof, half in section on the line 3—3 in Figs. 1 and 2. Fig. 4 is a fragmentary side elevation of the piston-rod of a single engine showing a modification of my invention. Fig. 5 is a cross-section thereof on the line 5—5 in Fig. 4. Fig. 6 is an enlarged fragmentary axial section of the end of the connecting rod showing the clutch mechanism used in this construction. Fig. 7 is a similar view of the clutch stud removed and the rod slightly tilted. Fig. 8 is a fragmentary side elevation similar to Fig. 4, but showing another modification. Fig. 9 is a cross-section thereof on the line 9—9.

I will now describe my invention as applied to a simple form of ordinary duplex engine, referring particularly to Figs. 1, 2 and 3, which illustrate its preferred adaptation. In this adaptation, the reciprocating piston-rods are driving parts and the shaft a driven part, the rods moving in opposite directions, and the engine being constructed in a well known manner to cushion the pistons at their extremities of stroke in order to overcome the momentum of the rods, and the engine shown being provided with a simple form of valve gear, whereby the valve for each cylinder is controlled by the piston-rod of the other cylinder to preserve opposite reciprocations in a well understood manner.

In Figs. 1, 2 and 3, let A represent the rotative shaft of a duplex engine; B, the piston-rods thereof; C C, the respective cylinders; D, the respective valve-gears therefor, and F the framework having bearings G for the shaft A and guides H for the rods B. The parts thus described may be of any usual or convenient construction, According to my invention I provide a connection between the shaft A and the rod B which will engage the two during one movement of the rod and disengage them during the other movement. Preferably a plurality of such connections are provided adapted one to engage during one movement and the other during the other movement, whereby each movement of the rod is accompanied by a driving connection with the shaft. Preferably the connection between the rod and shaft is such that the driving impulse is communicated to the shaft only during that portion of its revolution when a great leverage is obtained by reason of the connection being away from the dead center points, whereby the driving thrust is effective to substantially its full force to rotate the shaft, by reason of the avoidance substantially of the angularities incident to an ordinary crank motion.

In the construction shown in Figs. 1, 2 and 3, which will be described with reference to a single piston-rod, the connection between the piston-rod and the shaft is accomplished by providing a disk I, keyed on the shaft, a link J connected to the shaft, a friction wheel K carried by this link, preferably mounted eccentrically thereon and adapted to engage with the periphery of the disk I when moved in one direction, and to disengage therefrom when moved in the other, and a connecting rod L connected to said link and wheel and to the piston-rod B, and adapted to communicate the motion of the latter to the link and wheel. Preferably the piston-rod is constructed throughout a portion of its length in the form of a yoke M surrounding the shaft and inclosing the disk I, and the mechanism for connecting the latter with the piston-rod, which yoke M is fixed at its opposite ends to the remainder of the piston-rod, which consists in this construction of the cylindrical piston portion B′, to which the piston B″ is connected within the cylinder C, and the cylindrical guide portion B‴ at the opposite end which slides in the guide H. Preferably the link J is a plain link taking over the shaft A at its inner end, and receiving the shaft K′ of the friction wheel K at its outer end. Preferably the friction wheel K is mounted eccentrically of its shaft K′, whereby when it is moved in one direction its eccentricity will cause it to slide freely over the periphery of the disk I, and when moved in the other direction to bind against the periphery thereof, and thereby clutch the disk and wheel together. Preferably a leaf-spring a is provided on the link J, and normally presses against the wheel K to force it toward the binding position in contact with the disk I. Preferably this spring a is movably mounted, and the wheel K is constructed to be rotated on its shaft K′, whereby its eccentricity can be thrown to one side or the other of the link J in order to cause it to clutch the disk I in one direction or the other as may be desired, and the spring a is constructed to be movable to such position after such adjustment of the wheel K, that it will tend to force the wheel into engagement with the disk, whichever side the wheel may occupy relatively to the link J. Preferably the connecting rod L is duplicated, one of the rods engaging the shaft K′ of the wheel K at one side of the latter at one end, and connected at its other end to the yoke M, and the other rod L engaging the shaft K′ exteriorly of the link J at its one end and connected to the yoke M at its other end, the connection between the yoke and the ends of the rods being preferably formed by means of a pin b passing through the ends of the rods and through the yoke, and being at a point lateral of the axis of the shaft A, as well as the axis of the piston-rod, and substantially in a line with the mean path traveled by the axis of the friction wheel K during its engagement with the disk I. Preferably a catch N is provided on the end of the shaft K′ of the wheel K for shifting the wheel from one position to the other, and for retaining it in position when shifted. This preferably consists of an elastic piece having pins c c at its opposite ends, fixed to the shaft K′ at its middle, and adapted when the shaft is in one position to engage a groove or analogous provision d in the link J with one of its pins, and thereby prevent abnormal displacement of the wheel, and when the wheel is reversed to engage this groove with its opposite pin and similarly prevent displacement of the wheel from this position. The elasticity of the catch permits disengagement of its pin c from the groove d by springing the catch outwardly when it is desired to shift the eccentric wheels from one position to another.

Preferably to provide a driving connection at each motion of the rod, the mechanism just described is provided at each side of the driving shaft, in the construction, the link J, friction wheel K and rod L, being exactly duplicated at top and bottom of the disk I, the top one being constructed to grip the disk when the piston moves inwardly, and the bottom one when it moves outwardly.

A simple form of cushioning engine and valve gear is shown. The cushioning is effected by providing each steam port e of the cylinder somewhat in advance of the end of the latter, whereby a space e′ is left beyond the port, in which space the piston compresses the steam as it finishes the stroke. This overcomes the momentum of the piston at each end of the stroke in a well known manner. For a single engine of this type, the valve rod may be operated directly from the piston rod, as shown in dotted lines, by for example the simple provision shown in dotted lines in Fig. 1, where a tappet-rod f is carried by the yoke M, and has opposite stops adapted to strike the lever f′, and by tilting it, shift the valve-rod g of the valve gear D at each reciprocation of the piston rod.

In applying the invention to a duplex engine, I prefer the dispositions shown in Figs. 1, 2 and 3, wherein the piston-rod, the disk, and the connections intervening between the two, are exactly duplicated for each cylinder. Preferably the piston rods are in this disposition caused to move in opposite relative directions. I prefer to accomplish this by the construction of valve gear D′ shown in Fig. 2, wherein the valve-rod g of each cylinder is operated by the piston rod of the other cylinder. One well known simple form of accomplishing this is shown consisting of an eye h carried on the yoke of one piston-rod, a tappet-rod i passing through this eye and having stops at the opposite sides thereof and carried in a slide i′, and having a laterally fixed arm j connected to the valve-rod g of the cylinder for the other piston-rod, whereby as one piston rod moves in one direction its eye $h$ by engaging one of the stops of the tappet-rod $i$, will shift the latter, and through its arm $j$ and the valve rod $g$, will shift the valve of the piston. A substantial duplication of this construction of valve gear is similarly disposed for working the valve of the other cylinder.

In operation, the friction wheels being adjusted the one to grip the shaft during one movement and the other during the other movement of the piston rod, the engine is started and the motion of the rod in one direction is transmitted through the disk to the shaft by one of the friction wheels so long as the speed of movement of the piston rod in this direction is in excess of the peripheral speed of the disk I, but when the speed of the piston rod diminishes or its motion ceases or is reversed, the wheel previously gripping releases by reason of its eccentricity, and permits the continued movement of the disk. As the piston rod begins the return stroke, the other friction wheel grips the periphery of the disk and imparts the driving force of the piston rod to the shaft so long as the speed of the piston rod equals that of the periphery of the disk.

It will be seen that my invention provides an improved engine which can be variously utilized, in which the piston stroke may be comparatively short relatively to the circular path of the point of connection between the piston rod and the rotative shaft, and in which the driving thrust of the piston against the shaft is applied at great advantage.

It will be understood that my invention can be variously modified without departing from its essential features. One such modification is shown in Figs. 4, 5 and 6, in which the disk, here lettered I', is constructed with an under-cut groove $k$, and instead of the links J and friction wheels K for effecting connection between the rod and disk, studs P are provided carried by the connecting rods L, engaging the groove $k$, and having heads $l$ at the opposite sides of the groove, which heads are adapted when the studs are tilted to bite against the walls of the groove $k$ and thereby clutch themselves to the disk I', so that the latter must move with the movement of the piston-rod. The studs are constructed to clutch the one when the piston rod moves in one direction, and the other when it moves in the other direction. Various provisions for accomplishing this may be adopted, but I prefer the simple construction shown, which consists in providing a thimble Q in the end of the connecting rod L, and constructing this thimble with a hole $m$, which is enlarged at one side and parallel with the axis of the stud at the other side, through which hole the spindle of the stud passes and is fastened to connect it to the connecting rod L. By this construction, the motion of the rod throws the stud against the parallel side of the hole $m$. The stud will stand perpendicularly of the rod, and consequently parallel with the walls of the groove $k$ in the disk so that it will not bite against the latter, whereupon it can be freely moved through the groove, but when the opposite movement of the connecting rod takes place, the stud is tilted into the enlargement of the hole $m$, and this tilting of the stud enables the opposing corners of its heads $l\ l$ to bite against the walls of the groove $k$, and thereby clutch the disk I', so that the latter must follow the movement of the connecting rod. The sleeves Q will be arranged that for one stud and connecting rod with its enlargement in one direction, and that for the opposite stud with its enlargement in the opposite direction, whereby one will bite during one movement of the piston and the other during the opposite movement.

Another modification is shown in Figs. 8 and 9, wherein the disk, here lettered I'' is constructed with an under-cut groove $k'$ in its outer edge, and a biting stud lettered P' is engaged by this groove to bite its walls when tilted to connect the piston rod with the shaft during one motion, and to assume a radial position and slide through the groove during the reverse motion. This is here shown as accomplished by hinging the stud P' to the connecting rod with a butt-hinge joint $n$ which permits tilting movement of the stud in one direction, but acts as a stop to hold the stud in radial position relatively to the disk in the opposite direction. This view shows another modification of the invention wherein stiff but elastic connecting rods, here lettered L', are provided for the connection between the yoke of the piston rod and the studs P'. These are preferably stiff steel springs tending normally to maintain a rectilinear shape, and of sufficient rigidity to carry back the studs through the groove $k'$ during the passive stroke of each, and of sufficient strength to transmit the driving force of the piston rod through the studs to the disk during the working stroke of each.

What I claim is, in engines, the following-defined novel features and combinations, substantially as hereinbefore set forth, namely:

1. In a duplex engine, a rotative shaft, the cylinders and the reciprocating piston rods, in combination with connections between each of said rods and said shaft, each engaging its rod with said shaft to drive the latter when the rod is moved in one direction, and freeing it therefrom during the opposite movement, whereby said rods act successively on said shaft, and valve gear for said pistons preserving opposite movements of their respective piston rods.

2. In an engine, the combination, with a rotative shaft A, and a disk I thereon, of a piston rod B, a connecting rod L, an eccentric wheel K engaged by the latter and engaging the periphery of the disk, and a connecting link J pivoted on said shaft and engaging said wheel to preserve it in contact with said disk.

3. In an engine, the combination with a rotative shaft and a disk I thereon, of a piston rod B, a connecting rod L, an eccentric wheel K engaged by the latter and engaging the periphery of the disk, a connecting link J pivotally mounted upon the same axis and on said shaft and engaging said wheel to preserve it in contact with said disk, and a catch N preventing displacement of said wheel K.

4. In a device for converting motion, a driven shaft A and a disk I carried thereby, in combination with a reciprocating rod for driving said shaft, and a reversible friction clutch engaging said disk and connected to and operated by said rod, said clutch gripping said disk during one movement of the rod and freeing itself therefrom during the reverse movement, and means for reversing the action of said clutch, whereby by reversing said clutch the direction in which said shaft is rotated can be controlled, substantially as and for the purpose set forth.

5. In a device for transmitting motion, a driven shaft A and disk I carried thereby, in combination with a reciprocating rod B for driving said shaft, an oscillating link J pivotally mounted axially of said shaft, an eccentrically mounted friction wheel K carried by said link at the periphery of said disk, a spring a forcing said friction wheel toward said disk, and a connecting link L between said rod and clutch and transmitting the motion of the former to the latter, substantially as and for the purpose set forth.

In witness whereof I have hereunto signed my name in the presence of two subscribing witnesses.

JOHN J. O'NEILL.

Witnesses:
   GEORGE H. FRASER,
   FRED WHITE.